Oct. 8, 1963  K. H. HÄGGLUND ETAL  3,106,651
DEVICE FOR SUPPRESSING FUNDAMENTAL AND SUBHARMONIC FERROMAGNETIC
OSCILLATIONS IN ALTERNATING CURRENT CIRCUITS
Filed Dec. 6, 1957
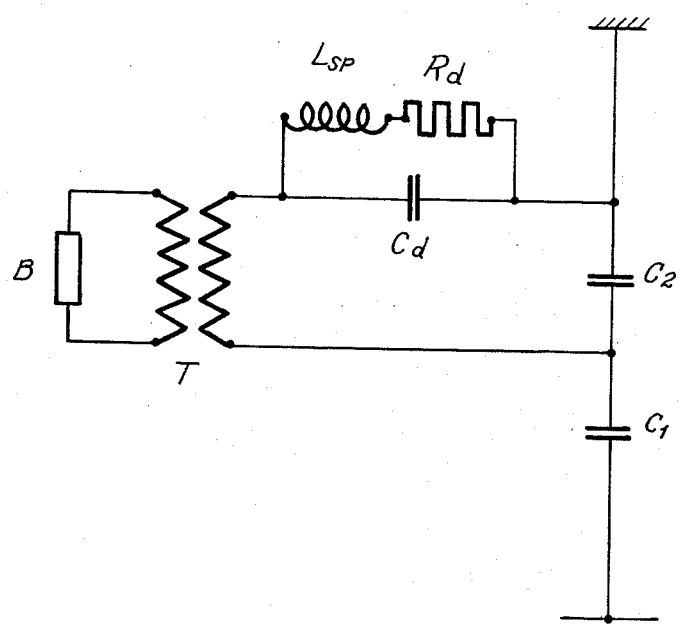
INVENTORS
KJELL HUGO HÄGGLUND
ERIK GEORG WESTERLUND
UNTO ALEXIS PEURON
By Hane and Nydick
ATTORNEYS

3,106,651
DEVICE FOR SUPPRESSING FUNDAMENTAL AND SUBHARMONIC FERROMAGNETIC OSCILLATIONS IN ALTERNATING CURRENT CIRCUITS
Kjell Hugo Hägglund, Sundbyberg, and Erik Georg Westerlund, Stockholm, Sweden, and Unto Alexis Peuron, Sharon, Pa., assignors to Telefonaktiebolaget L M Ericsson, Stockholm, Sweden, a corporation of Sweden
Filed Dec. 6, 1957, Ser. No. 701,158
Claims priority, application Sweden Dec. 6, 1956
3 Claims. (Cl. 307—105)

In condenser voltage transformers, which consist of a magnetic transformer connected to a condenser voltage divider, there easily arise ferromagnetic oscillations due to the interaction of the linear capacitive reactances of the condenser voltage divider and the non-linear inductive reactance of the magnetic transformer, the frequency of said oscillations generally being lower than the working frequency.

It is well known that this oscillation tendency can be suppressed by introducing on the primary side of the magnetic transformer a damping circuit consisting of a resistance shunted by an impedance of such a dimension that the resistance at power frequency is short-circuited but at other frequency conducts a current that produces a damping effect on the oscillation. The impedance in such a circuit is generally tuned for resonance at power frequency.

This invention refers to an improved damping device which is on one hand more effective than previously known devices, on the other hand cheaper in manufacture because the components of the device may be of rather small dimensions. The device is mainly characterized by a damping resistance connected in series with a blocking reactor and by a condenser connected in parallel with these series connected elements, the blocking reactor and the condenser being so dimensioned that fundamental frequency currents of normal values and currents of the harmonics to an essential extent pass through the condenser while subharmonic currents and abnormally high fundamental frequency currents pass through the damping resistance and the blocking reactor, the reactance of which considerably decreases due to saturation.

The invention will be further described in connection with the enclosed drawing which shows a condenser voltage transformer with a damping device according to the invention. Two condensers in a capacitive voltage divider are indicated by $C_1$ and $C_2$; T is a magnetic transformer connected across the condenser $C_2$ via an auxiliary condenser $C_d$ and B is a load on the transformer T, for example a measuring instrument. The damping device consists of a damping resistance $R_d$, a blocking reactor $L_{sp}$ and the auxiliary condenser $C_d$, the damping resistance $R_d$ and the blocking reactor $L_{sp}$ together constituting a series circuit which is connected in parallel with the auxiliary condenser $C_d$.

The characteristic of the blocking reactor $L_{sp}$ is such, that at normal working conditions it does not conduct current. At abnormal working conditions and particularly at a subharmonic oscillation the voltage across the condenser rises, thereby increasing the current through the blocking reactor, whereby this is becoming saturated and its reactance decreases. Owing to this the current through the resistance $R_d$ increases still more, the resistance having a damping effect on the oscillation.

As an illustration of the dimensioning of the damping circuit the following data may be given:

(1) $\qquad C_2 = 0.12\ \mu f.$ (2) $+\dfrac{1}{2\pi 50 C_d} = 60{,}000\,\Omega$ (reactance at the fundamental frequency 50 p.s.)

(3) $R_d = 80{,}000\,\Omega$ (independent of the frequency)

(4) [a] $2\pi 50 \cdot L_{sp} > 1.0$ MΩ at a current value of $10 \cdot 10^{-3}$ ampere
    [b] $2\pi 50 \cdot L_{sp} < 3{,}500\,\Omega$ at a current value of $300 \cdot 10^{-3}$ ampere

We claim:

1. In an alternating current circuit comprising condensers and non-linear inductive reactances, a circuit arrangement for surpressing subharmonic oscillations and fundamental oscillations exceeding a predetermined value, connected in series with said alternating current circuit and comprising a condenser branch and a parallel branch having a damping resistance and a saturable blocking reactor in series, the ratio of impedances at fundamental frequency of said two branches being chosen so as to give a current value below the magnetic saturation value through the reactor at normal current value through said condenser, said saturation value being surpassed at an increase of current through said parallel branch due to increase of voltage across said parallel branch caused by an increase of the voltage across the condenser branch whereby appearing oscillations are suppressed.

2. A suppressor network for suppressing subharmonic oscillations and fundamental oscillations above a predetermined value in a capacitor-voltage transformer including a capacitative voltage divider and a magnetic transformer connected to each other, said network comprising two parallel branches connected in series with the voltage divider and the magnetic transformer, one of said branches including a capacitance means and the other a damping resistance means and a saturable blocking reactor, the ratio of the impedances of said branches being such that below a predetermined voltage across said capacitance means said reactor conducts current below its magnetic saturation value and that in response to an increase of the voltage above said value due to the presence of oscillations to be suppressed, the saturation of said reactor rises whereby the resulting decrease in the reactance of the reactor causes a corresponding increase of the current through the damping resistance means in series with the reactor whereby appearing oscillations are suppressed.

3. A suppressor circuit system for suppressing subharmonic oscillations and fundamental oscillations above a predetermined value in an alternating circuit system, said suppressor circuit system comprising two capacitance means connected in series, a magnetic transformer having a primary and a secondary winding, circuit means including an auxiliary capacitance means connected to said primary winding across one of said two capacitance means, a damping resistance means, a saturable blocking reactor connected in series across said auxiliary capacitance means, the impedance of said reactor and said auxiliary capacitance means in relation to each other being such that a current flow through the reactor is below the saturation flow in response to a voltage across said auxiliary capacitance means indicative of oscillations below said predetermined value and that the current flow increases to the saturation flow in response to an increase of a voltage across the auxiliary capacitance means indicative of oscillations above said value whereby the current flow through the damping resistance means increases correspondingly whereby appearing oscillations are suppressed.

References Cited in the file of this patent

FOREIGN PATENTS

| | | |
|---|---|---|
| 543,187 | Germany | Feb. 2, 1932 |
| 64,934 | Norway | Nov. 28, 1934 |
| 846,704 | France | Sept. 12, 1939 |
| 410,281 | Italy | Apr. 3, 1945 |